US011900314B2

(12) United States Patent
Wang et al.

(10) Patent No.: US 11,900,314 B2
(45) Date of Patent: Feb. 13, 2024

(54) ASSET AND SENSOR MAPPING (71) Applicant: INTERNATIONAL BUSINESS MACHINES CORPORATION, Armonk, NY (US)

(72) Inventors: Xinlin Wang, Irvine, CA (US); Rachel Lea Jarvie, Durham, NC (US); Qingyan Wang, Sudbury, MA (US); Yajin Zheng, Acton, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 395 days.

(21) Appl. No.: 16/783,363

(22) Filed: Feb. 6, 2020

(65) Prior Publication Data
US 2021/0248544 A1 Aug. 12, 2021

(51) Int. Cl.
*G06Q 10/087* (2023.01)
*G06F 16/245* (2019.01)
*G01C 21/00* (2006.01)
*G05D 1/00* (2006.01)
*G06K 7/10* (2006.01)

(52) U.S. Cl.
CPC ......... *G06Q 10/087* (2013.01); *G01C 21/005* (2013.01); *G05D 1/0094* (2013.01); *G06F 16/245* (2019.01); *G06K 7/10366* (2013.01)

(58) Field of Classification Search
CPC .. G06Q 10/087; G01C 21/005; G05D 1/0094; G06F 16/245; G06K 7/10366
USPC .......................................................... 705/28
See application file for complete search history.

(56) References Cited

U.S. PATENT DOCUMENTS

| 9,049,207 | B2 | 6/2015 | Hugard, IV |
| 9,744,671 | B2 | 8/2017 | Connell, II |
| 2013/0159351 | A1 | 6/2013 | Hamann |
| 2013/0275574 | A1 | 10/2013 | Hugard, IV |
| 2015/0326436 | A1 | 11/2015 | Wesby |

(Continued)

FOREIGN PATENT DOCUMENTS

| CN | 105678359 A | 6/2016 | |
| CN | 110795439 A * | 2/2020 | ............. G01C 21/32 |

(Continued)

OTHER PUBLICATIONS

Curran, et al., "An Evaluation of Indoor Location Determination Technologies," Journal of Location Based Services, vol. 5, No. 2, Jun. 2011, ISSN: 1748-9725, Taylor & Francis, pp. 1-17.

(Continued)

*Primary Examiner* — Russell S Glass
(74) *Attorney, Agent, or Firm* — Rakesh Roy (57) ABSTRACT

A method, computer system, and a computer program product for mapping is provided. The present invention may include locating an asset using an unmanned vehicle (UV), where the asset include a sensor device that is not mapped to the asset. The present invention may also include recording, using the UV, a sensor identifier of the sensor device. The present invention may include recording a location of the sensor device based on determining a location of the UV when the sensor device is detected. The present invention may further include registering the recorded sensor identifier of the sensor device with the asset to map the sensor device to the asset.

18 Claims, 7 Drawing Sheets

(56) References Cited

U.S. PATENT DOCUMENTS

| | | | |
|---|---|---|---|
| 2016/0203391 A1 | 7/2016 | Connell, II | |
| 2016/0318530 A1 | 11/2016 | Johnson | |
| 2018/0285813 A1 | 10/2018 | Siris | |
| 2018/0292983 A1 | 10/2018 | Nor | |
| 2018/0307241 A1* | 10/2018 | Holz | G05D 1/0274 |
| 2018/0321356 A1* | 11/2018 | Kulkarni | H04W 64/003 |
| 2019/0208112 A1* | 7/2019 | Kleinbeck | G01R 29/0892 |
| 2019/0236732 A1* | 8/2019 | Speasl | G01C 21/206 |
| 2021/0133670 A1* | 5/2021 | Cella | G06N 3/044 |

FOREIGN PATENT DOCUMENTS

| | | | | |
|---|---|---|---|---|
| CN | 111149141 A | * | 5/2020 | G05D 1/0287 |
| ES | 2749151 T3 | * | 3/2020 | G01S 13/74 |
| JP | 6274840 B2 | | 2/2018 | |
| WO | 2019094729 A1 | | 5/2019 | |

OTHER PUBLICATIONS

Disclosed Anonymously, "Cooperative data supplementation and analytics for industrial assets," An IP.com Prior Art Database Technical Disicosure, IPCOM000258877D, Jun. 20, 2019, pp. 1-28.
Mell et al., "The NIST Definition of Cloud Computing", National Institute of Standards and Technology, Special Publication 800-145, Sep. 2011, 7 pages.

\* cited by examiner

ASSET AND SENSOR MAPPING

BACKGROUND

The present invention relates generally to the field of computing, and more particularly to Internet of Things (IoT)-enabled asset management.

Recent innovations in IoT technologies have enabled remote asset management using IoT sensors, where sensor data may be analyzed to track asset performance, perform asset maintenance, and predict asset failure. However, in order for the sensor data to provide useful business insights and planning information, users need to know the physical asset sources of the sensor devices reporting the sensor data.

SUMMARY

Embodiments of the present invention disclose a method, computer system, and a computer program product for mapping. The present invention may include locating an asset using an unmanned vehicle (UV), where the asset include a sensor device that is not mapped to the asset. The present invention may also include recording, using the UV, a sensor identifier of the sensor device. The present invention may include recording a location of the sensor device based on determining a location of the UV when the sensor device is detected. The present invention may further include registering the recorded sensor identifier of the sensor device with the asset to map the sensor device to the asset.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for automatic mapping of sensors and assets. As such, the present embodiment has the capacity to improve the technical field of IoT-enabled asset management by using location based information combined with unique identifiers of both assets and sensors to complete automatic sensor and asset mapping without human interaction. More specifically, an asset including at least one sensor that is not mapped to the asset may be located by an unmanned vehicle. Next, the unmanned vehicle may record a sensor identifier of the at least one sensor of the asset. Then, the recorded sensor identifier of the at least one sensor may be registered with the asset to map the at least one sensor to the asset. Thereafter, the mapping information may be stored with an enterprise resource planning (ERP) system and used for asset management.

As described previously, recent innovations in IoT technologies have enabled remote asset management using IoT sensors, where sensor data may be analyzed to track asset performance, perform asset maintenance, and predict asset failure. However, in order for the sensor data to provide useful business insights and planning information, users need to know the physical asset sources of the sensor devices reporting the sensor data. Errors in the recorded mapping of a sensor device to an asset may cause the monitoring of the asset to be flawed due to the wrong sensor reporting measurements.

Therefore, it may be advantageous to, among other things, provide a way to detect a sensor identifier of a sensor deployed to monitor an asset and automatically map the sensor, determined by the sensor identifier, to the asset.

Figure 1:
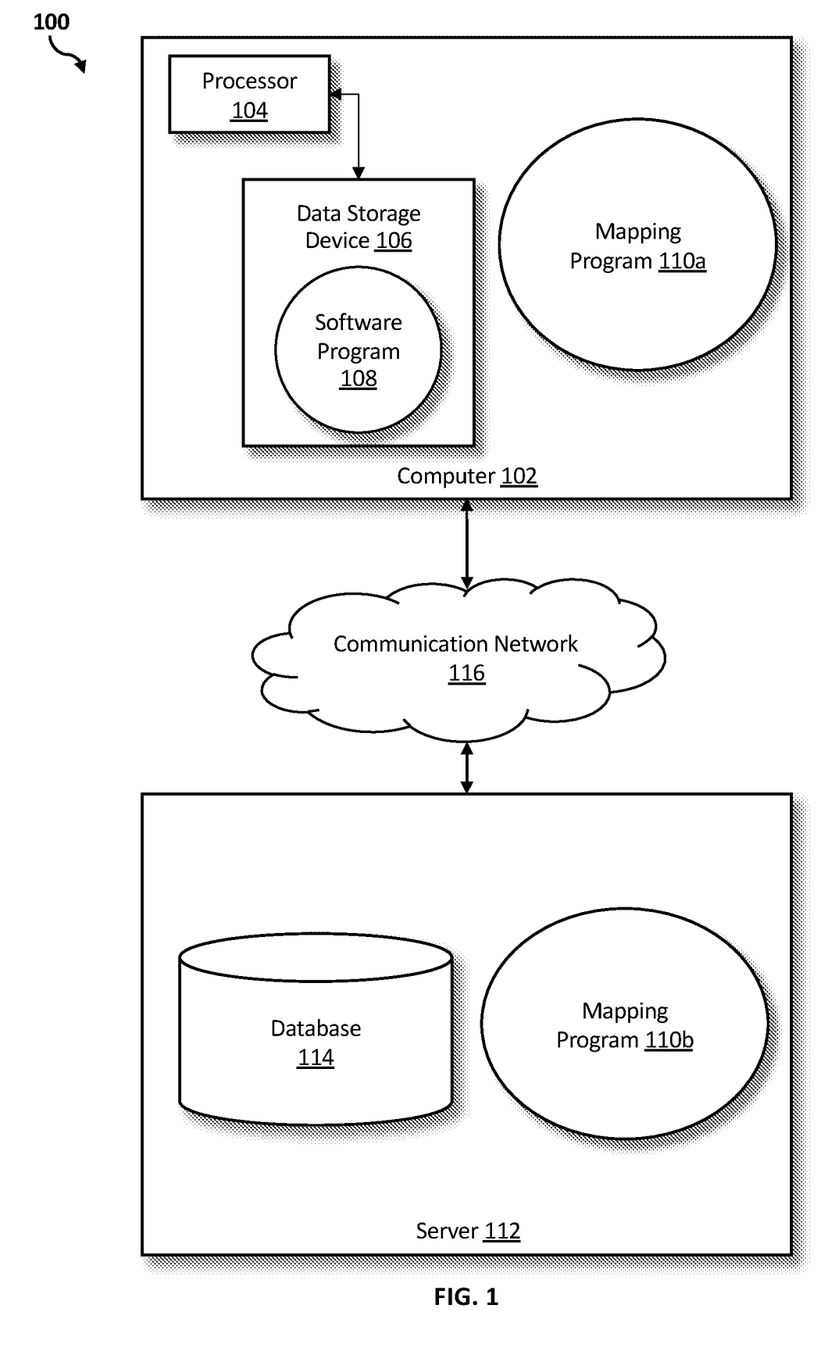
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a mapping program 110a. The networked computer environment 100 may also include a server 112 that is enabled to run a mapping program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902*b* and external components 904*b*, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the mapping program 110*a*, 110*b* may interact with a database 114 that may be embedded in various storage devices, such as, but not limited to a computer/mobile device 102, a networked server 112, or a cloud storage service.

Figure 2:
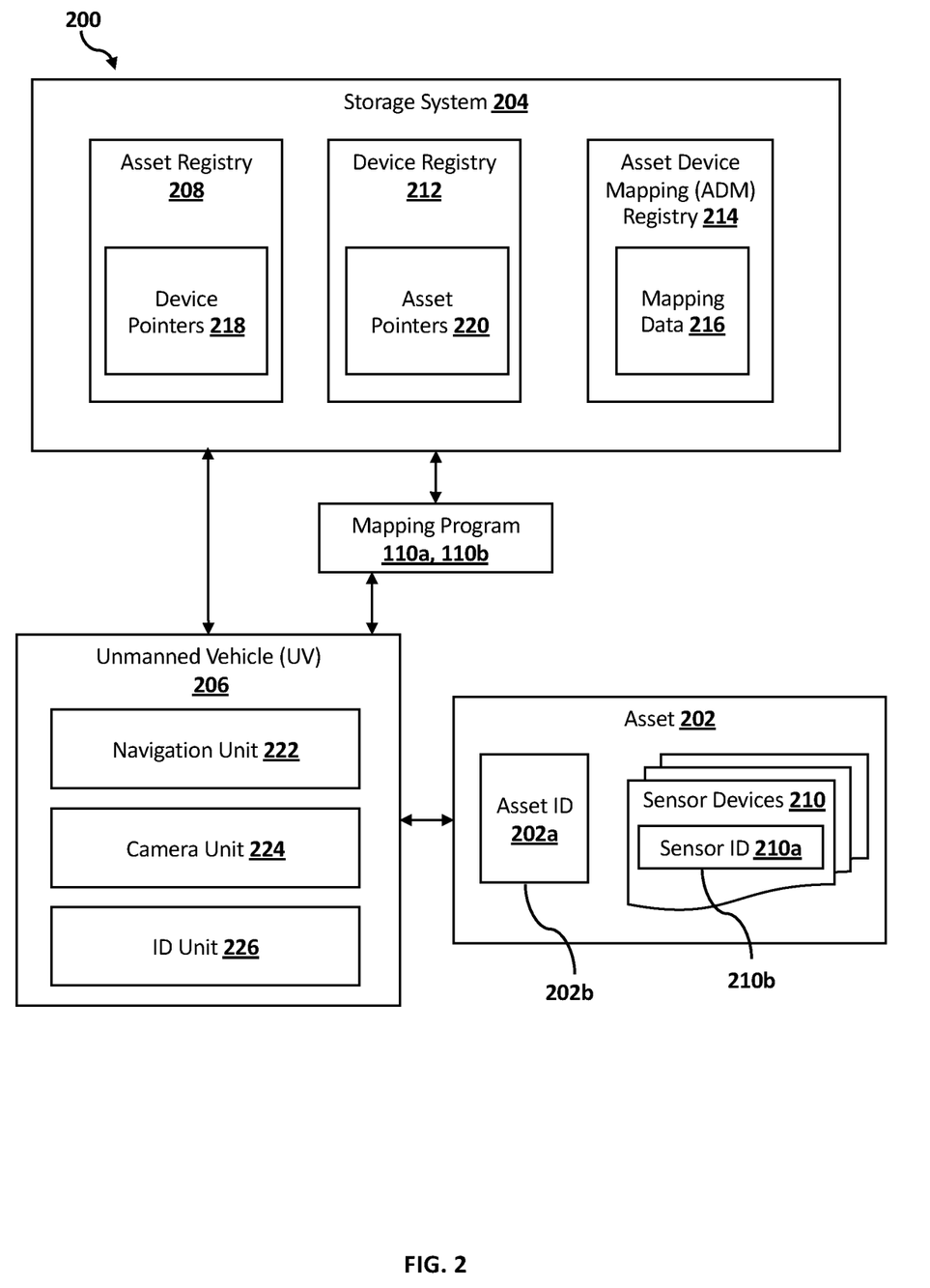
FIG. 2 is a schematic block diagram of an asset management system according to at least one embodiment.

Referring now to FIG. 2, a schematic block diagram of an asset management system 200 implementing the mapping program 110*a*, 110*b* according to at least one embodiment is depicted.

According to one embodiment, the asset management system 200 may include a computer system (e.g., client computer(s) 102 and/or server computer(s) 112) having a tangible storage device that is enabled to run the mapping program 110*a*, 110*b*. In one embodiment, the mapping program 110*a*, 110*b* may include a single computer program or multiple program modules or sets of instructions being executed by the processor of the computer system. The mapping program 110*a*, 110*b* may include routines, objects, components, units, logic, data structures, and actions that may perform particular tasks or implement particular abstract data types. The mapping program 110*a*, 110*b* may be practiced in distributed cloud computing environments where tasks are performed by remote processing devices that may be linked through a communication network (e.g., communication network 116). In one embodiment, the mapping program 110*a*, 110*b* may include program instructions that may be collectively stored on one or more computer-readable storage media.

According to one embodiment, the asset management system 200 may also generally include one or more assets 202, a storage system 204, and one or more unmanned vehicles (UV) 206.

Asset 202 may include physical assets found in various industries, such as, for example, the construction industry (e.g., cranes, buildings), the manufacturing industry (e.g., factory equipment), the energy production industry (e.g., oil and gas pipelines), the transportation industry (e.g., bridges and tunnels), the communication industry (e.g., cellphone towers), and other similar industries.

According to one embodiment, each asset 202 may include a unique identifier (ID), such as, for example, an asset ID 202*a*. The asset ID 202*a* may include a unique ID value (e.g., electronic product code (EPC)) which may be embedded into a tag or label 202*b* (e.g., radio frequency identification (RFID) tag or bar code). In one embodiment, the tag 202*b* may include a radio frequency identification (RFID) tag and/or bar code. In at least one embodiment, the tag 202*b* may include a Bluetooth® (Bluetooth and all Bluetooth-based trademarks and logos are trademarks or registered trademarks of Bluetooth SIG, Inc. and/or its affiliates) enabled tag. In one embodiment, the RFID tag types may include: a passive tag, an active tag, or a battery-assisted passive tag. The tag 202*b* may include an integrated circuit for storing and processing information (e.g., from RF signals) and an antenna for receiving and transmitting signals. In one embodiment, the tag 202*b* may store tag information (e.g., in non-volatile memory), which may include, for example, the asset ID 202*a*. In one embodiment, the asset ID 202*a* may include a string of characters and/or numbers (e.g., serial number) which may be implemented to identify and communicate with a respective tag 202*b* of the asset 202. In another embodiment, the unique ID of the asset 202 may include an identifying image which may be processed using image recognition software to identify the asset 202.

In at least one embodiment, the asset 202 may be added to the asset management system 200 by registering the asset 202 with an asset registry 208 provided in the storage system 204. The storage system 204 may be embedded in various storage devices, such as, but not limited to a computer/mobile device 102, a networked server 112, or a cloud storage service. According to one embodiment, for each registered asset 202, the asset registry 208 may store an entry including the asset ID 202*a*, along with additional information, such as, for example, the asset name, the asset type, and the asset location. In some embodiments, the asset registry 208 may also store an identifying image of the asset 202 and any other suitable information needed for adding the asset 202 to the asset management system 200.

As shown in FIG. 2, the asset management system 200 may include one or more sensor devices 210 for measuring sensor data (e.g., attributes of the physical asset) regarding respective assets 202. According to one embodiment, sensor devices 210 may include, for example, temperature sensors, pressure sensors, vibration sensors, and any other suitable sensors capable of capturing sensor data to support asset management and maintenance. In one embodiment, sensor devices 210 may be installed directly on a surface of the asset 202 (e.g., vibration sensor). In another embodiment, sensor devices 210 may be installed inside of the asset 202 (e.g., flow sensor). In other embodiments, sensor devices 210 may be installed in proximity of the asset 202 (e.g., temperature sensor).

Each sensor device 210 may include a sensor ID 210*a* unique to the respective sensor device 210. In one embodiment, the sensor ID 210*a* may include a unique ID value (e.g., EPC) which may be embedded into a tag or label 210*b* (e.g., RFID tag or bar code). In some embodiments, a given sensor device 210 may include multiple sensor IDs 210*a* configured to identify the sensor device 210.

In one embodiment, the RFID tag types of the sensor device 210 may include: a passive tag, an active tag, or a battery-assisted passive tag. The tag 210*b* may include an integrated circuit for storing and processing information (e.g., from RF signals) and an antenna for receiving and transmitting signals. In one embodiment, the tag 210*b* may store tag information (e.g., in non-volatile memory), which may include, for example, the sensor ID 210*a*. In one embodiment, the sensor ID 210*a* may include a string of characters and/or numbers (e.g., serial number) which may be implemented to identify and communicate with a respective tag 210*b* of the sensor device 210.

According to one embodiment, each sensor device 210 may be added to the asset management system 200 by registering the sensor device 210 with a device registry 212 provided in the storage system 204. In one embodiment, the device registry 212 may store one or more sensor IDs 210*a* of each sensor device 210 that is deployed to the assets 202. Each entry in the device registry 212 may include the sensor ID 210*a* associated with each sensor device 210, as well as a device name, device type, a manufacturer, part number, and any information needed for adding the sensor devices 210 to the asset management system 200.

As noted above, the asset registry 208 may include information regarding the assets 202 registered with the asset management system 200. Similarly, the device registry 212 may include information regarding the sensor devices 210 registered with the asset management system 200. However, in at least one embodiment, the asset management system 200 may not initially know the mapping of the sensor devices 210 to the asset 202. Without the mapping information, the sensor data captured from the sensor devices 210 may not be linked to the particular asset 202 where the sensor devices 210 are deployed.

In some solutions, a set of sensor devices deployed to a given asset may be mapped using a manual process. In the manual process, a user may need to manually identify every sensor device and respective sensor ID deployed to the given asset and build a data structure listing the respective sensor IDs with the asset ID of the given asset. The manual mapping process may be tedious and error prone, especially in instances where the given asset may include hundreds or thousands of deployed sensor devices. Errors in the recorded mapping of the sensor devices to the asset may cause the monitoring of the asset to be flawed due to the wrong sensor device reporting measurements. Errors may add additional cost to the deployment and services of IoT based solutions for asset management.

Accordingly, the present embodiments may provide solutions for automatically mapping the sensor devices 210 to the respective assets 202 that the sensor devices 210 are monitoring. In one embodiment, the mapping program 110a, 110b may be implemented to locate the asset 202 including one or more sensor devices 210. Then, the mapping program 110a, 110b may collect the asset ID 202a of the asset 202 and the sensor IDs 210a of the sensor devices 210 in proximity of the location of the asset 202. Next, the mapping program 110a, 110b may query the asset registry 208 to determine (e.g., receive) the asset 202 registered with the collected asset ID 202a. Similarly, the mapping program 110a, 110b may query the device registry 212 to determine the sensor devices 210 registered with the collected sensor IDs 210a. Thereafter, the mapping program 110a, 110b may generate an association between the asset 202 and the sensor devices 210 determined to be in proximity of the location of the asset 202. In one embodiment, the mapping program 110a, 110b may store a mapping data 216 indicating the association between the asset 202 and the sensor devices 210. In one embodiment, the mapping program 110a, 110b may store the mapping data 216 in an asset device mapping (ADM) registry 214 is provided in the storage system 204. In another embodiment, the mapping program 110a, 110b may generate device pointers 218 stored in the asset registry 208, where the device pointers 218 may link the assets 202 stored in the asset registry 208 to the associated sensor devices 210 stored in the device registry 212. In other embodiments, the mapping program 110a, 110b may generate asset pointers 220 stored in the device registry 212, where the asset pointers 220 may link the sensor devices 210 stored in the device registry 212 to the associated assets 202 stored in the asset registry 208.

According to one embodiment, the asset management system 200 may automate the process of locating and identifying the assets 202 and the sensor devices 210 by implementing one or more unmanned vehicles (UV) 206. The UV 206 may include, for example, an unmanned ground vehicle, an unmanned aerial vehicle, an unmanned underwater vehicle, or any suitable unmanned system (e.g., remote controlled, remote guided, autonomous) or robot configured to navigate to a target (e.g., asset 202 and the sensor devices 210 in proximity of the asset 202) and record data to support the process of the mapping program 110a, 110b described above.

In one embodiment, the UV 206 may include, without limitation, a navigation unit 222, a camera unit 224, and a identification (ID) unit 226.

According to one embodiment, the navigation unit 222 may include a global positioning system (GPS). The navigation unit 222 may provide the UV 206 with location information (e.g., map coordinates) of the target (e.g., asset 202 and associated sensor devices 210) such that the UV 206 may be directed to the particular location of the target. In one embodiment, the mapping program 110a, 110b may provide the UV 206 with the location information of a particular asset 202 such that the UV 206 may locate the particular asset 202 to record the data regarding the sensor devices 210. In one embodiment, the mapping program 110a, 110b may access the location information of the asset 202 stored in the asset registry 208 and pass the location information to the UV 206. In some embodiment, the UV 206 may communicate directly with the asset registry 208 to query the location information of the particular asset 202. The navigation unit 222 of the UV 206 may also be implemented to record location information regarding the sensor devices 210, which may be used to map the sensor devices 210 to the asset 202.

In at least one embodiment, the sensor devices 210 may not include a built-in GPS location sensor (e.g., for cost reduction). As will be further detailed below, the tag 210b of the sensor device 210 may not be read and/or recorded until the tag unit 226 of the UV 206 is in close proximity to the sensor device 210. When the UV 206, which includes the ID unit 226, is able to read the tag 210b, the UV 206 may be in close proximity to the sensor device 210. Accordingly, when a particular tag 210b is detected, the GPS location of the UV 206 may be recorded at that time and used as the location of the sensor device 210 associated with that particular tag 210b. According to one embodiment, the UV 206 may record and store an event information (e.g., payload) as time "t", GPS location of the UV 206 at the time "t", and the detected sensor ID(s) 210a of the sensor device(s) 210 at the time "t".

According to one embodiment, the camera unit 224 may include various types of cameras, such as, for example, high-definition cameras, video cameras, infrared cameras, X-ray cameras, night-vision cameras, and any other suitable imaging device. In one embodiment, the camera unit 224 may be implemented to identify the asset 202. For example, the camera unit 224 may capture still images or videos of the asset 202 and compare the captured images with one or more images of the asset 202 stored in the asset registry 208 to detect the asset 202. In some embodiments, the camera unit 224 may be implemented to capture images of the sensor devices 210 found at the asset 202. The captured images may be used to verify the accuracy of the mapping performed by the mapping program 110a, 110b. In at least one embodiment, the camera unit 224 may be implemented to work with the navigation unit 222 for guidance to the asset 202 and avoidance of obstacles in the path to the asset 202.

According to one embodiment, the ID unit 226 may include, for example, an RFID reader and/or bar code scanner. In other embodiments, the ID unit 226 may include any code reader which may be configured to read a code imbedded in a tag at a certain proximity. The ID unit 226 may be implemented to communicate with the tag 210b of the sensor device 210 to read and record the sensor ID 210a. For example, the ID unit 226 may employ passive RFID technology (e.g., passive, active, or battery-assisted passive) to read and/or scan the tag 210b (e.g., integrated circuit) to extract the identification information stored on the tag 210b, which may include the sensor ID 210a. Similarly, the ID unit 226 may also be implemented to communicate with the tag 202b of the asset 202 to read and record the asset ID 202a.

According to one embodiment, the mapping program 110a, 110b may implement the UV 206 to record each sensor ID 210a with a location information of the sensor device 210 and a time stamp. In some embodiments, the UV 206 may also capture a photo of each sensor device 210 using the camera unit 224. The recorded data for each sensor device 210 may be grouped as an event. In one embodiment, the event recorded by the UV 206 may include the following exemplary code snippet [1]:

uv-event={
"sensor-id"="<epc code>, <epc code> . . . "
"location.x"=x
"location.y"=y
"location.z"=z
"timestamp"=[time when sensor-id is detected]
"picture_meta_data"=[optional, asset name or other attributes of the asset]
} [1]

As shown in code snippet [1], the UV 206 may record the sensor ID 210a in the "sensor-id" field. In embodiments, the "sensor-id" may include one or more "epc codes" as shown above. In other embodiments, the "sensor-id" may include one or more bar codes or any other unique ID value which may be used to identify the sensor device 210. According to one embodiment, the geolocation of the sensor device 210 may be recorded as a three-dimensional Cartesian vector, as indicated by the "location.x" field, "location.y" field, and "location.z" field in code snippet [1]. In other embodiments, the geolocation of the sensor device 210 may be recorded using GPS coordinates. As previously noted, the geolocation (e.g., GPS) of the sensor device 210 may be determined by the geolocation of the UV 206 at the time when the sensor device 210 is detected by the ID unit 226 of the UV 206. In one embodiment, the UV 206 may record an event each time the sensor device 210 is detected by the ID unit 226. In some embodiments, the UV 206 may record the event according to a time interval, such as, for example, every two seconds.

The UV 206 may transmit the recorded event data directly to a cloud storage system, which may comprise the storage system 204. In at least one embodiment, the UV 206 may include a local storage unit, which may be used to store the recorded events until the recorded events may be downloaded and accessed by the mapping program 110a, 110b.

With access to the recorded events from the UV 206, the mapping program 110a, 110b may use the recorded sensor IDs 210a and recorded asset ID 202a to map to the respective sensor devices 210 and asset 202 stored in the device registry 212 and asset registry 208. Then the mapping program 110a, 110b may use the recorded geolocation information of the sensor devices 210 to map the asset 202 and sensor devices 210 together according to location proximity. In one embodiment, the mapping program 110a, 110b may register the recorded sensor IDs 210a with the asset 202 to generate the mapping data 216 stored in the ADM registry 214.

After the mapping process, the asset management system 200 may use the mapping information, together with the asset registry 208 and the device registry 212, to generate accurate sensor data for a particular asset 202.

Figure 3:
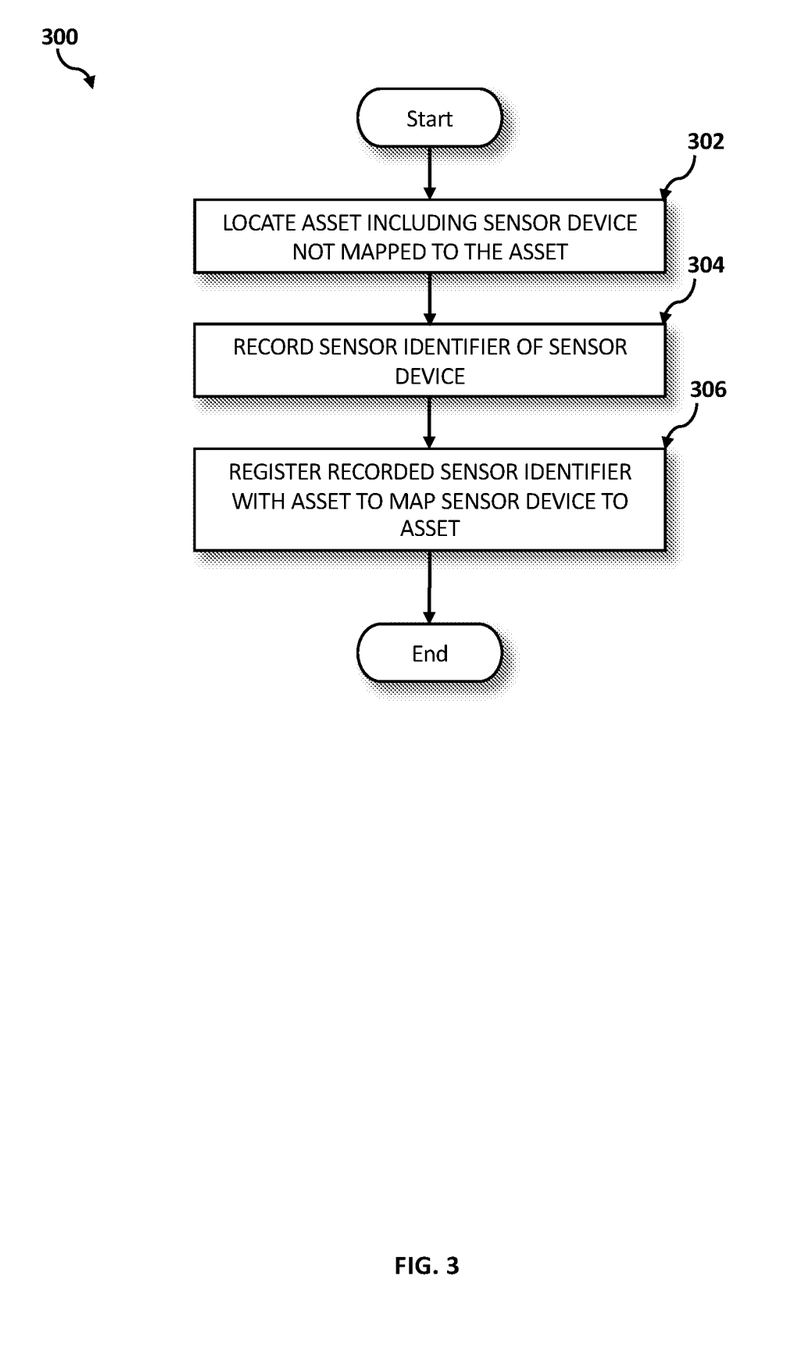
FIG. 3 is an operational flowchart illustrating a process for mapping according to at least one embodiment.

Referring now to FIG. 3, an operational flowchart illustrating the exemplary mapping process 300 used by the mapping program 110a, 110b according to at least one embodiment is depicted.

At 302, an asset including a sensor device that is not mapped to the asset is located. In one embodiment, the mapping program 110a, 110b may instruct an unmanned vehicle (UV), such as, UV 206, to locate an asset being monitored by one or more sensor devices that are not currently mapped to the asset, previously described with reference to FIG. 2. In one embodiment, the mapping program 110a, 110b may detect that the asset is located based on an asset identifier read by the UV and/or an image of the asset recognized by the UV.

Then at 304, a sensor identifier of the sensor device is recorded. As previously described with reference to FIG. 2, each sensor device at the asset may include a sensor identifier, such as, for example, the sensor ID 202a. In one embodiment, the UV may detect the sensor device included in the asset based on the tag (e.g., RFID tag). The mapping program 110a, 110b may implement the UV to record each sensor identifier, along with a device location (e.g., geolocation information of the sensor device determined by the UV location when the sensor device is detected by the UV), a time stamp, and an image of each sensor device. In one embodiment, each recorded event may be transmitted from the UV to a cloud storage system for access by the mapping program 110a, 110b. In other embodiments, the recorded events may be stored locally on the UV for later access by the mapping program 110a, 110b. In one embodiment, the UV 206 may similarly record and store an asset identifier of the located asset for access by the mapping program 110a, 110b.

Then at 306, a recorded sensor identifier is registered with the asset to map the sensor device to the asset. In one embodiment, the mapping program 110a, 110b may receive, from the UV, the asset identifier of the asset and the sensor identifiers of the sensor devices in proximity of the location of the asset. Next, the mapping program 110a, 110b may query the asset registry to determine the asset (e.g., asset name) registered with the asset identifier. Similarly, the mapping program 110a, 110b may query the device registry to determine the sensor devices (e.g., sensor device names) registered with the sensor identifiers. Thereafter, the mapping program 110a, 110b may automatically generate an association (e.g., electronically link) between the asset and the sensor devices determined to be in proximity of the location of the asset by registering the respective sensor identifiers with the asset. In one embodiment, the mapping program 110a, 110b may store a mapping data indicating the link or association between the asset and the sensor devices. As previously described with reference to FIG. 2, the mapping program 110a, 110b may store the mapping data in an ADM registry provided in the storage system. In another embodiment, the mapping program 110a, 110b may generate device pointers in the asset registry which may point to the mapped sensor devices stored in the device registry. Similarly, in some embodiments, the mapping program 110a, 110b may generate asset pointers stored in the device registry, where the asset pointers may link the sensor devices stored in the device registry to the mapped assets stored in the asset registry. In one embodiment, the mapping program 110a, 110b may use the recorded images of the sensor devices to verify the mapping of the sensor devices to the asset.

Figure 4:
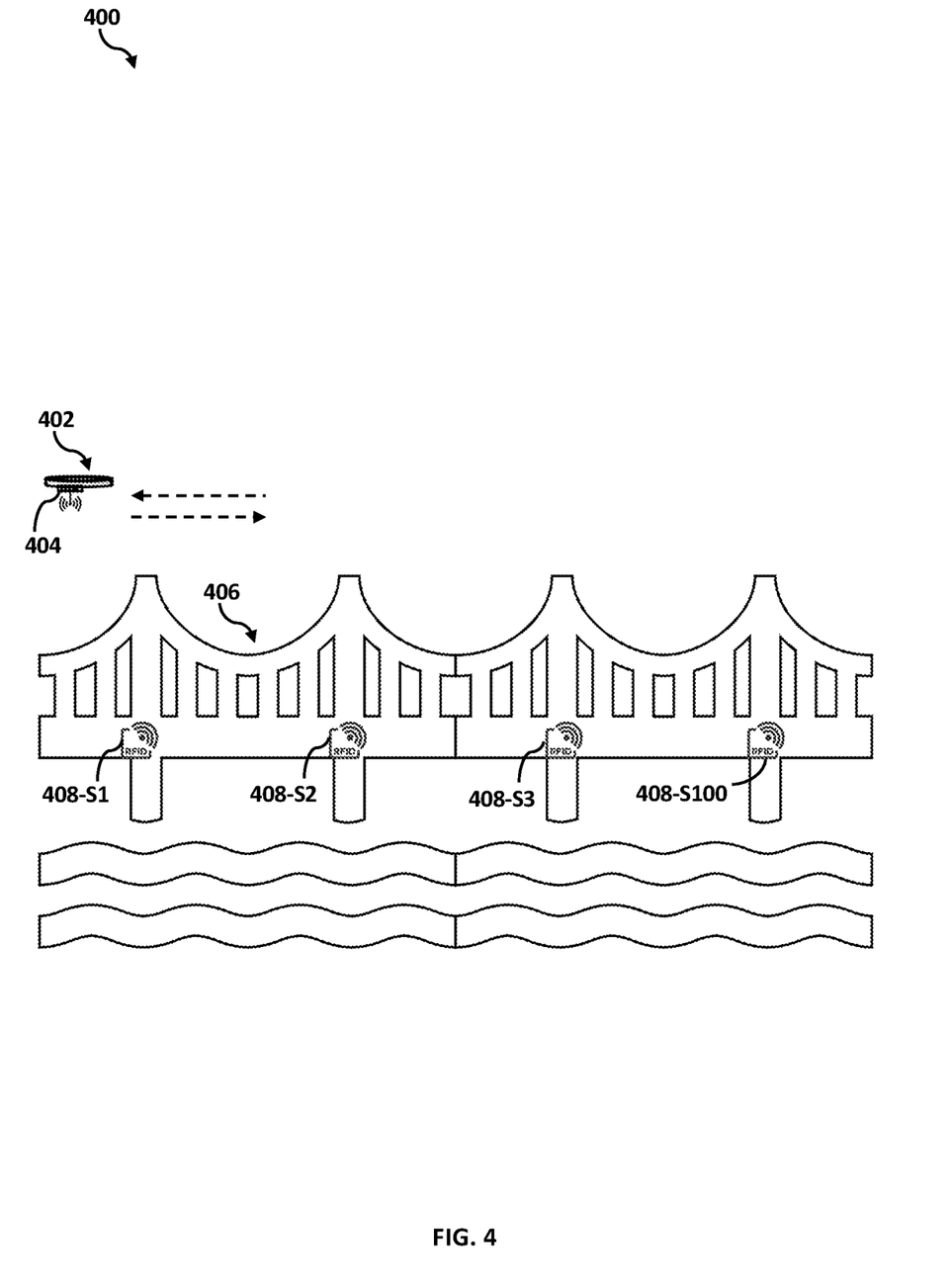
FIG. 4 is a diagram illustrating an exemplary mapping process used by a mapping program according to at least one embodiment.

Referring now to FIG. 4, a diagram 400 illustrating an exemplary mapping process used by the mapping program 110a, 110b according to at least one embodiment is depicted.

An asset management system may include an unmanned aerial vehicle (UAV) 402, similar to UV 206 described in FIG. 2. In one embodiment, the UAV 402 may include an RFID reader 404, a GPS sensor (e.g., navigation unit 222), and a camera (e.g., camera unit 224).

In one embodiment, the asset management system may include an asset, such as, for example, a bridge 406, shown in FIG. 4. Bridge 406 may include 100 vibration sensors installed. However, for purposes of illustration, FIG. 4 only depicts four vibration sensors 408-S1, 408-S2, 408-S3, and 408-S100. As shown in FIG. 4, each vibration sensor may include an RFID tag storing a unique sensor identifier.

In one embodiment, the mapping program 110a, 110b may provide the UAV 402 with a geolocation information of the bridge 406. Once at the bridge 406, the UAV 402 may use the RFID reader 404 to detect the RFID tags of the 100 vibration sensors installed on the bridge 406. For each detected RFID tag, the UAV 402 may record an event including the sensor identifier (e.g., epc code), the location, the time stamp, and an image of the sensor. In one embodiment, the location of the sensor identifier may be determined by the location of the UAV 402 when the particular RFID tag is detected by the RFID reader 404. For example, when the UAV 402 is in close proximity to the vibration sensor 408-S2, such that the RFID reader 404 may read the sensor identifier of the vibration sensor 408-S2, at the time, the mapping program 110a, 110b may record the time stamp and location of the UAV 402. According to one embodiment, it is contemplated that the location of the UAV 402 at that time stamp may be equivalent or substantially equivalent to the location of the vibration sensor 408-S2.

In one embodiment, the events recorded by the UAV 402 may be transmitted to a cloud storage system in real-time for access by the mapping program 110a, 110b. Thereafter, the mapping program 110a, 110b may link the unique sensor identifiers of vibration sensors 408-S1 to 408-S100 recorded by the UAV 402 to the asset, bridge 406. After the completion of the mapping process, the asset management system may use the mapping information to determine that any sensor data received from vibration sensors 408-S1 to 408-S100 pertain to bridge 406.

The functionality of a computer may be improved by the mapping program 110a, 110b because the mapping program 110a, 110b may automatically establish sensor to asset mapping. Errors in the recorded mapping of a sensor to an asset may cause a computer to generate incorrect data when monitoring an asset. This may add additional cost to the deployment and services of IoT based solutions for asset management. The mapping program 110a, 110b may automate the process of locating and identifying assets and sensor devices by implementing one or more unmanned vehicles configured to detect the assets and sensor devices. After collecting the asset identifier of the asset and the sensor identifiers of the sensor devices in proximity of the location of the asset, the mapping program 110a, 110b may automatically map the sensor devices to the respective assets that the sensor devices are monitoring.

It may be appreciated that FIGS. 2 to 4 provide only an illustration of one embodiment and do not imply any limitations with regard to how different embodiments may be implemented. Many modifications to the depicted embodiment(s) may be made based on design and implementation requirements.

Figure 5:
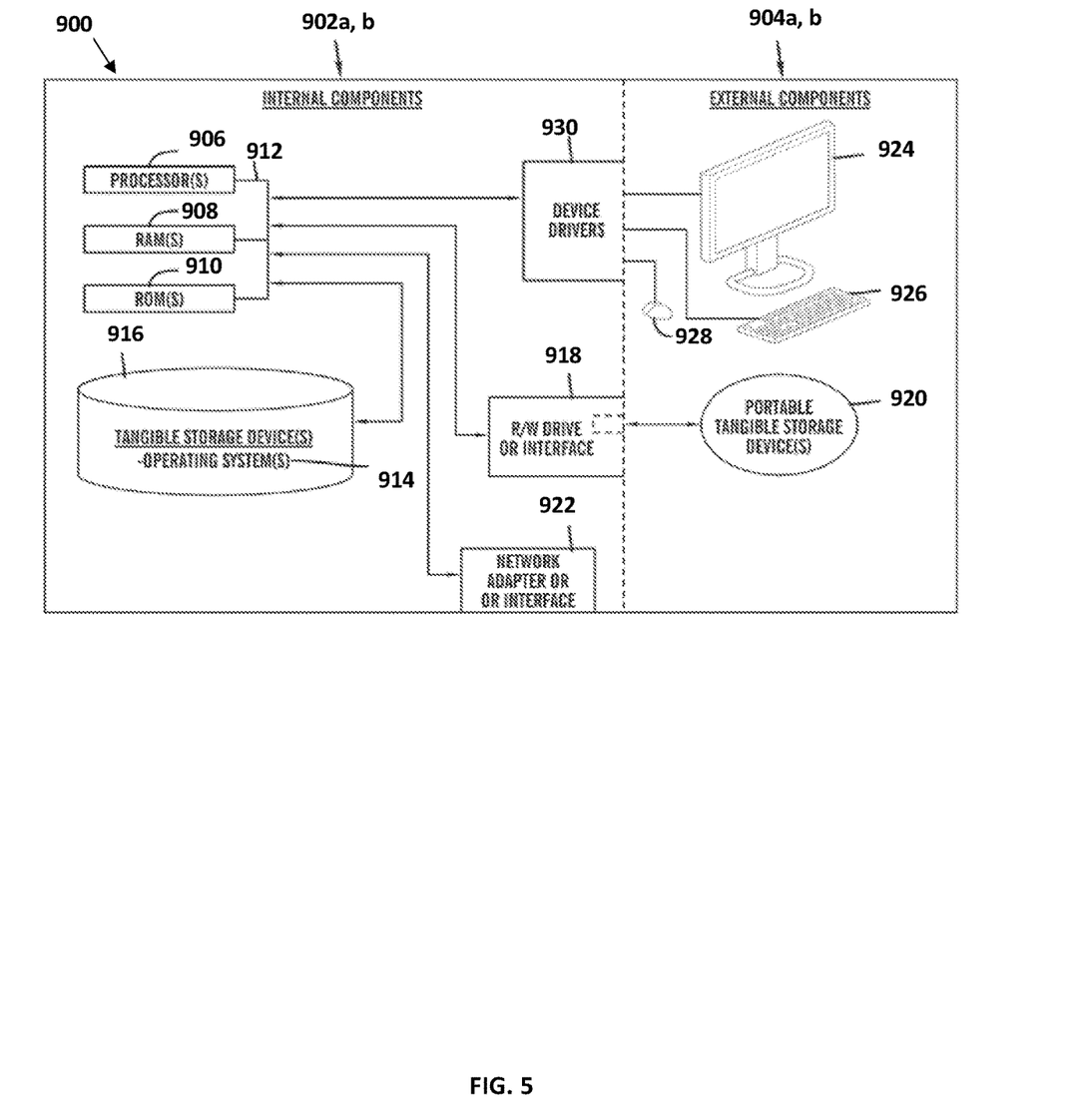
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the mapping program 110a in client computer 102, and the mapping program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the mapping program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the mapping program 110a in client computer 102 and the mapping program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the mapping program 110a in client computer 102 and the mapping program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
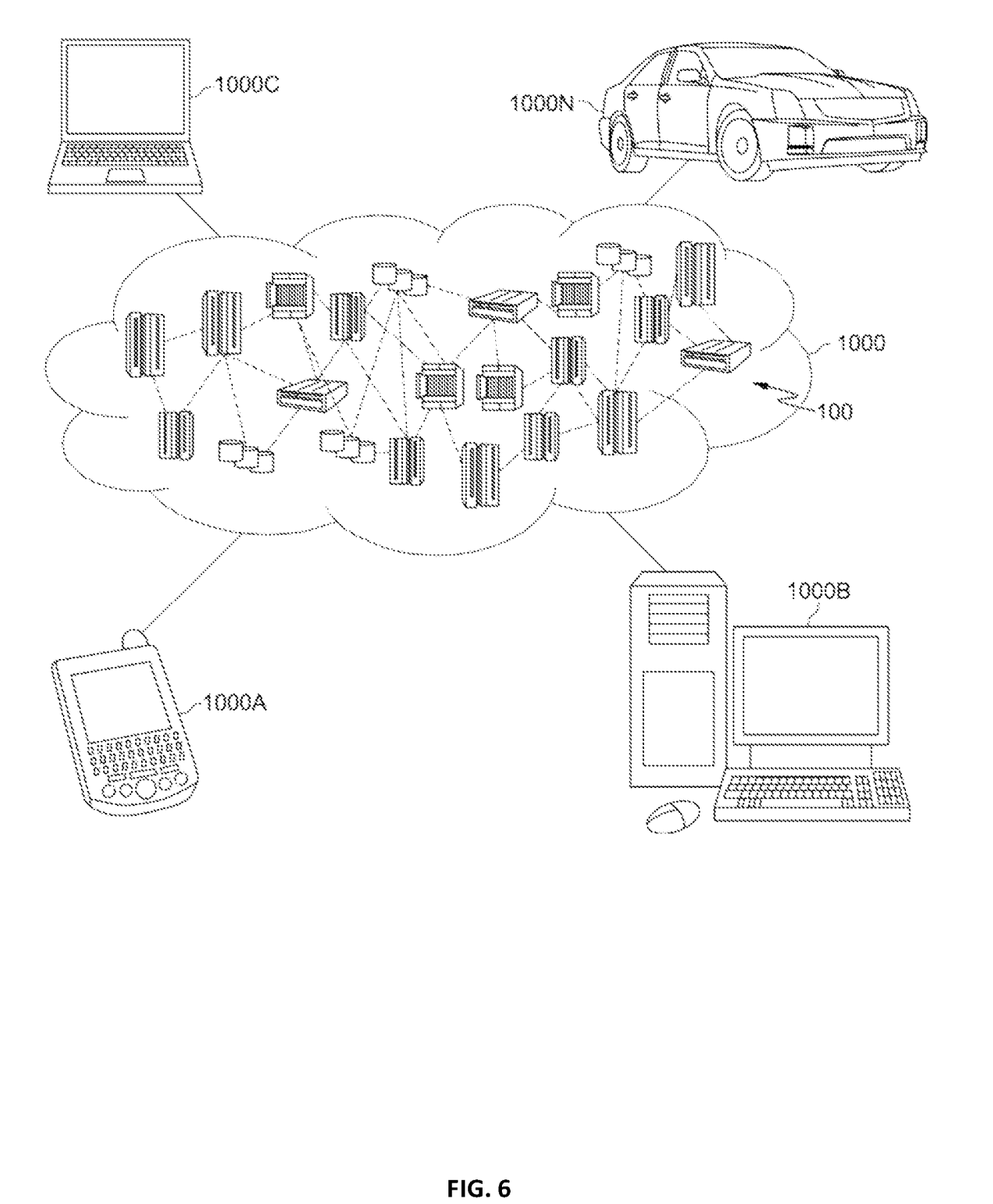
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
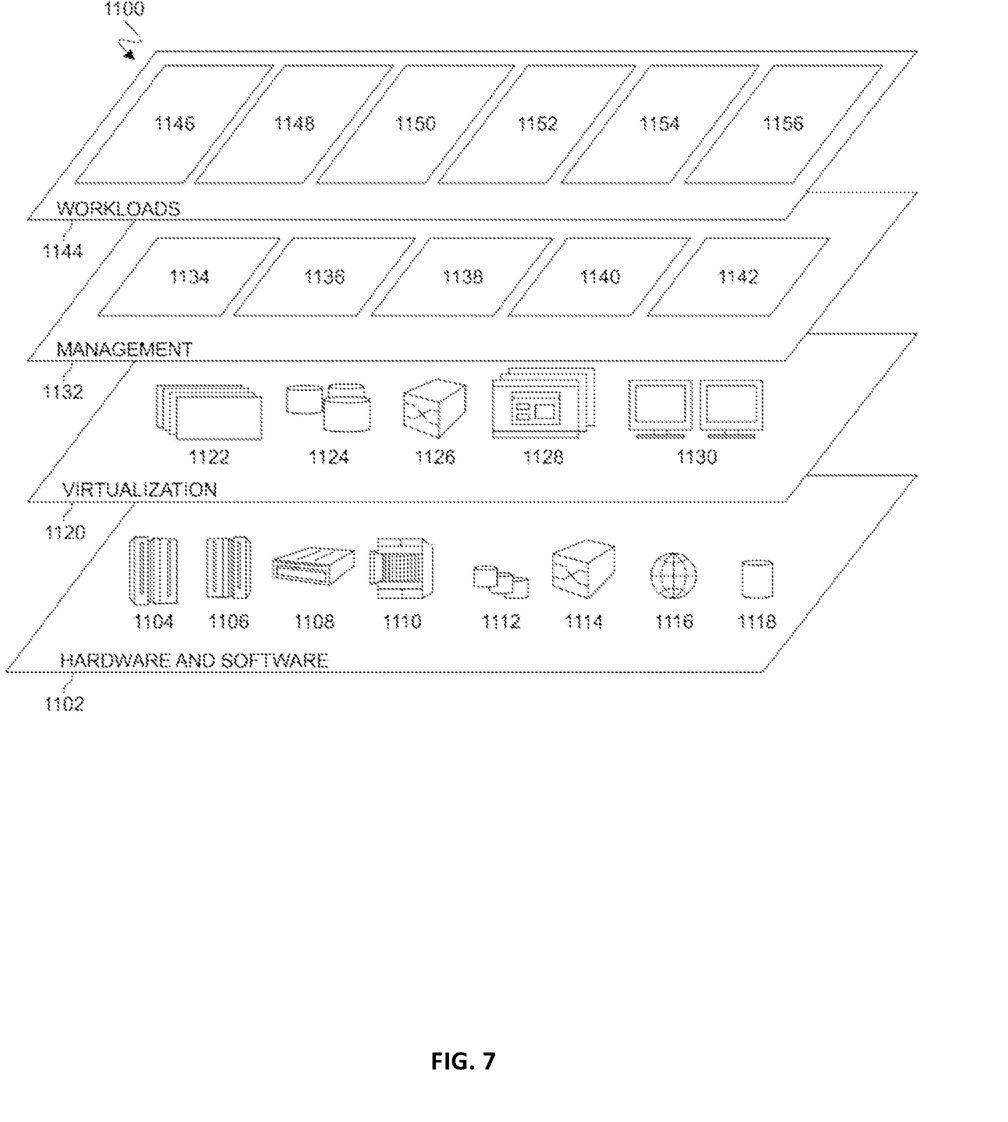
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and mapping 1156. A mapping program 110a, 110b provides a way to automatically generate an association between an asset and a sensor device deployed to monitor the asset.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
locating an asset using an unmanned vehicle (UV), wherein the located asset includes a sensor device having a specific device location in proximity of the located asset;
recording, using the UV, a sensor identifier of the sensor device at a first timestamp;
in response to querying a device registry using the recorded sensor identifier, determining that the sensor device is not mapped to the located asset;
determining the specific device location of the determined sensor device that is not mapped to the asset based on a location of the UV at the first timestamp; and
registering the recorded sensor identifier of the determined sensor device with the located asset to map the determined sensor device to the determined specific device location in proximity of the located asset.

2. The method of claim 1, further comprising:
receiving an asset identifier of the located asset;
in response to querying an asset registry using the received asset identifier, determining the located asset; and
generating an association between the determined asset and the determined sensor device.

3. The method of claim 1, further comprising:
detecting, using the UV, the determined sensor device included in the located asset based on a Radio Frequency Identification (RFID) tag of the determined sensor device;
recording, using the UV, the determined specific device location of the detected sensor device based on determining the location of the UV;
determining, based on the recorded specific device location, that the detected sensor device is in proximity of the located asset; and
linking the detected sensor device to the located asset in a storage system.

4. The method of claim 1, further comprising:
identifying the located asset in an asset registry; and
generating a device pointer in the asset registry to map the identified asset to the determined sensor device.

5. The method of claim 1, further comprising:
recording, using the UV, an image of the determined sensor device included in the located asset; and
verifying, using the recorded image of the determined sensor device, a mapping of the determined sensor device to the located asset.

6. The method of claim 1, further comprising:
communicating, using the UV, with a respective RFID tag of a plurality of sensor devices located in proximity of the located asset;
recording, using the UV, each sensor identifier embedded in the respective RFID tag of the plurality of sensor devices;
identifying, using each recorded sensor identifier, the plurality of sensor devices registered in a device registry; and
mapping the identified plurality of sensor devices to the located asset based on location proximity.

7. A computer system for mapping, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

locating an asset using an unmanned vehicle (UV), wherein the located asset includes a sensor device having a specific device location in proximity of the located asset;

recording, using the UV, a sensor identifier of the sensor device at a first timestamp;

in response to querying a device registry using the recorded sensor identifier, determining that the sensor device is not mapped to the located asset;

determining the specific device location of the determined sensor device that is not mapped to the asset based on a location of the UV at the first timestamp; and registering the recorded sensor identifier of the determined sensor device with the located asset to map the determined sensor device to the determined specific device location in proximity of the located asset.

8. The computer system of claim 7, further comprising:
receiving an asset identifier of the located asset;
in response to querying an asset registry using the received asset identifier, determining the located asset; and
generating an association between the determined asset and the determined sensor device.

9. The computer system of claim 7, further comprising:
detecting, using the UV, the determined sensor device included in the located asset based on a Radio Frequency Identification (RFID) tag of the determined sensor device;
recording, using the UV, the determined specific device location of the detected sensor device based on determining the location of the UV;
determining, based on the recorded specific device location, that the detected sensor device is in proximity of the located asset; and
linking the detected sensor device to the located asset in a storage system.

10. The computer system of claim 7, further comprising:
identifying the located asset in an asset registry; and
generating a device pointer in the asset registry to map the identified asset to the determined sensor device.

11. The computer system of claim 7, further comprising:
recording, using the UV, an image of the determined sensor device included in the located asset; and
verifying, using the recorded image of the determined sensor device, a mapping of the determined sensor device to the located asset.

12. The computer system of claim 7, further comprising:
communicating, using the UV, with a respective RFID tag of a plurality of sensor devices located in proximity of the located asset;
recording, using the UV, each sensor identifier embedded in the respective RFID tag of the plurality of sensor devices;
identifying, using each recorded sensor identifier, the plurality of sensor devices registered in a device registry; and
mapping the identified plurality of sensor devices to the located asset based on location proximity.

13. A computer program product for mapping, the computer program product comprising:
one or more computer-readable storage media and program instructions collectively stored on the one or more computer-readable storage media, the program instructions comprising:
program instructions to locate an asset using an unmanned vehicle (UV), wherein the located asset includes a sensor device having a specific device location in proximity of the located asset;
program instructions to record, using the UV, a sensor identifier of the sensor device at a first timestamp;
program instructions to in response to querying a device registry using the recorded sensor identifier, determine that the sensor device is not mapped to the located asset;
program instructions to determine the specific device location of the determined sensor device that is not mapped to the asset based on a location of the UV at the first timestamp; and
program instructions to register the recorded sensor identifier of the determined sensor device with the located asset to map the determined sensor device to the determined specific device location in proximity of the located asset.

14. The computer program product of claim 13, further comprising:
program instructions to receive an asset identifier of the located asset;
program instructions to in response to querying an asset registry using the received asset identifier, determine the located asset;
and
program instructions to generate an association between the determined asset and the determined sensor device.

15. The computer program product of claim 13, further comprising:
program instructions to detect, using the UV, the determined sensor device included in the located asset based on a Radio Frequency Identification (RFID) tag of the determined sensor device;
program instructions to record, using the UV, the determined specific device location of the detected sensor device based on determining the location of the UV;
program instructions to determine, based on the recorded specific device location, that the detected sensor device is in proximity of the located asset; and
program instructions to link the detected sensor device to the located asset in a storage system.

16. The computer program product of claim 13, further comprising:
program instructions to identify the located asset in an asset registry; and
program instructions to generate a device pointer in the asset registry to map the identified asset to the determined sensor device.

17. The computer program product of claim 13, further comprising:
program instructions to record, using the UV, an image of the determined sensor device included in the located asset; and
program instructions to verify, using the recorded image of the determined sensor device, a mapping of the determined sensor device to the located asset.

18. The computer program product of claim 13, further comprising:
program instructions to communicate, using the UV, with a respective RFID tag of a plurality of sensor devices located in proximity of the located asset;

program instructions to record, using the UV, each sensor identifier embedded in the respective RFID tag of the plurality of sensor devices;

program instructions to identify, using each recorded sensor identifier, the plurality of sensor devices registered in a device registry; and program instructions to map the identified plurality of sensor devices to the located asset based on location proximity.

* * * * *